US009197717B2

(12) United States Patent
Gibbon et al.

(10) Patent No.: US 9,197,717 B2
(45) Date of Patent: Nov. 24, 2015

(54) SERVER-SIDE SCHEDULING FOR MEDIA TRANSMISSIONS ACCORDING TO CLIENT DEVICE STATES

(71) Applicant: AT&T Intellectual Property I, LP, Atlanta, GA (US)

(72) Inventors: David Crawford Gibbon, Lincroft, NJ (US); Andrea Basso, Turin (IT)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

(21) Appl. No.: 14/092,073

(22) Filed: Nov. 27, 2013

(65) Prior Publication Data

US 2015/0149592 A1    May 28, 2015

(51) Int. Cl.
    *G06F 15/16* (2006.01)
    *H04L 29/08* (2006.01)
    *G06F 1/32* (2006.01)

(52) U.S. Cl.
    CPC ............ *H04L 67/325* (2013.01); *G06F 1/3209* (2013.01)

(58) Field of Classification Search
    CPC .................................................... H04N 21/443
    See application file for complete search history.

(56) References Cited

U.S. PATENT DOCUMENTS

| 5,434,972 | A  | * | 7/1995  | Hamlin ......................... 709/238 |
| 6,363,411 | B1 | * | 3/2002  | Dugan et al. .................. 709/202 |
| 6,954,435 | B2 | * | 10/2005 | Billhartz et al. .............. 370/252 |
| 8,213,444 | B1 | * | 7/2012  | Harris et al. .................. 370/412 |
| 8,239,911 | B1 | * | 8/2012  | Sun .............................. 725/118 |
| 8,527,647 | B2 |   | 9/2013  | Gopalakrishnan |
| 8,549,570 | B2 |   | 10/2013 | Forsman et al. |
| 8,578,015 | B2 | * | 11/2013 | Billhartz ....................... 709/224 |
| 8,700,028 | B2 | * | 4/2014  | Harris et al. .................. 455/425 |
| 8,751,845 | B2 | * | 6/2014  | Assad et al. .................. 713/340 |

(Continued)

FOREIGN PATENT DOCUMENTS

| WO | 2013022470 A1 | 2/2013 |
| WO | 2013089437 A1 | 6/2013 |

OTHER PUBLICATIONS

Lederer, Stefan et al., "Dynamic Adaptive Streaming over HTTP Dataset", Proceedings of the 3rd Multimedia Systems Conference. ACM, 2012.

(Continued)

*Primary Examiner* — David X Yi
*Assistant Examiner* — Atta Khan
(74) *Attorney, Agent, or Firm* — Guntin & Gust, PLC; Jay H. Anderson

(57) ABSTRACT

A system embodying the subject disclosure includes a memory to store instructions. A controller coupled to the memory, responsive to executing the instructions, can perform operations including obtaining performance characteristics for segments of a network; the segments are selected based on a trajectory of a mobile device coupled to the network. The controller can predict future transport and segment characteristics based on the performance characteristics. The controller can receive a request from the mobile device for transmission of a data packet over the network. The controller can monitor a power state of the mobile device and predict a future power state of the mobile device. The controller can determine a target time for fulfilling the request, based on the future power state and the future transport and segment characteristics. The controller can schedule a time for fulfilling the request according to the target time. Other embodiments are disclosed.

18 Claims, 12 Drawing Sheets

(56) References Cited

U.S. PATENT DOCUMENTS

| | | | |
|---|---|---|---|
| 8,838,722 B2* | 9/2014 | Ridges et al. | 709/208 |
| 8,891,510 B2* | 11/2014 | Sachs et al. | 370/351 |
| 2012/0124179 A1 | 5/2012 | Cappio et al. | |
| 2012/0317189 A1* | 12/2012 | Einarsson et al. | 709/203 |
| 2013/0067052 A1 | 3/2013 | Reynolds et al. | |
| 2013/0091249 A1 | 4/2013 | McHugh et al. | |
| 2013/0144984 A1 | 6/2013 | Zhao et al. | |
| 2013/0227122 A1 | 8/2013 | Gao et al. | |
| 2013/0227158 A1 | 8/2013 | Miller et al. | |
| 2013/0247118 A1 | 9/2013 | Oyman | |

OTHER PUBLICATIONS

Liu, Chenghao et al., "Rate adaptation for dynamic adaptive streaming over HTTP in content distribution network", Signal Processing: Image Communication 27.4, 2012, 288-311.

Michalos, M. G. et al., "Dynamic Adaptive Streaming over HTTP", Journal of Engineering Science and Technology Review 5.2, 2012, 30-34.

\* cited by examiner

100

200

300

600

700

800

SERVER-SIDE SCHEDULING FOR MEDIA TRANSMISSIONS ACCORDING TO CLIENT DEVICE STATES

FIELD OF THE DISCLOSURE

The subject disclosure relates to media distribution and content delivery management, and more specifically to a server-side scheduling scheme for media transmissions according to states of a client device.

BACKGROUND

Media content (for example, segments of video presentations) can be transferred from a server to a client according to various scheduling schemes which may be viewed as client-side scheduling or server-side scheduling. In particular, Dynamic Adaptive Streaming over HTTP, also known as MPEG-DASH, is a standard that describes client-side video transmission and manipulation of video segments.

BRIEF DESCRIPTION OF THE DRAWINGS

Reference will now be made to the accompanying drawings, which are not necessarily drawn to scale, and wherein.

DETAILED DESCRIPTION

Figure 1:
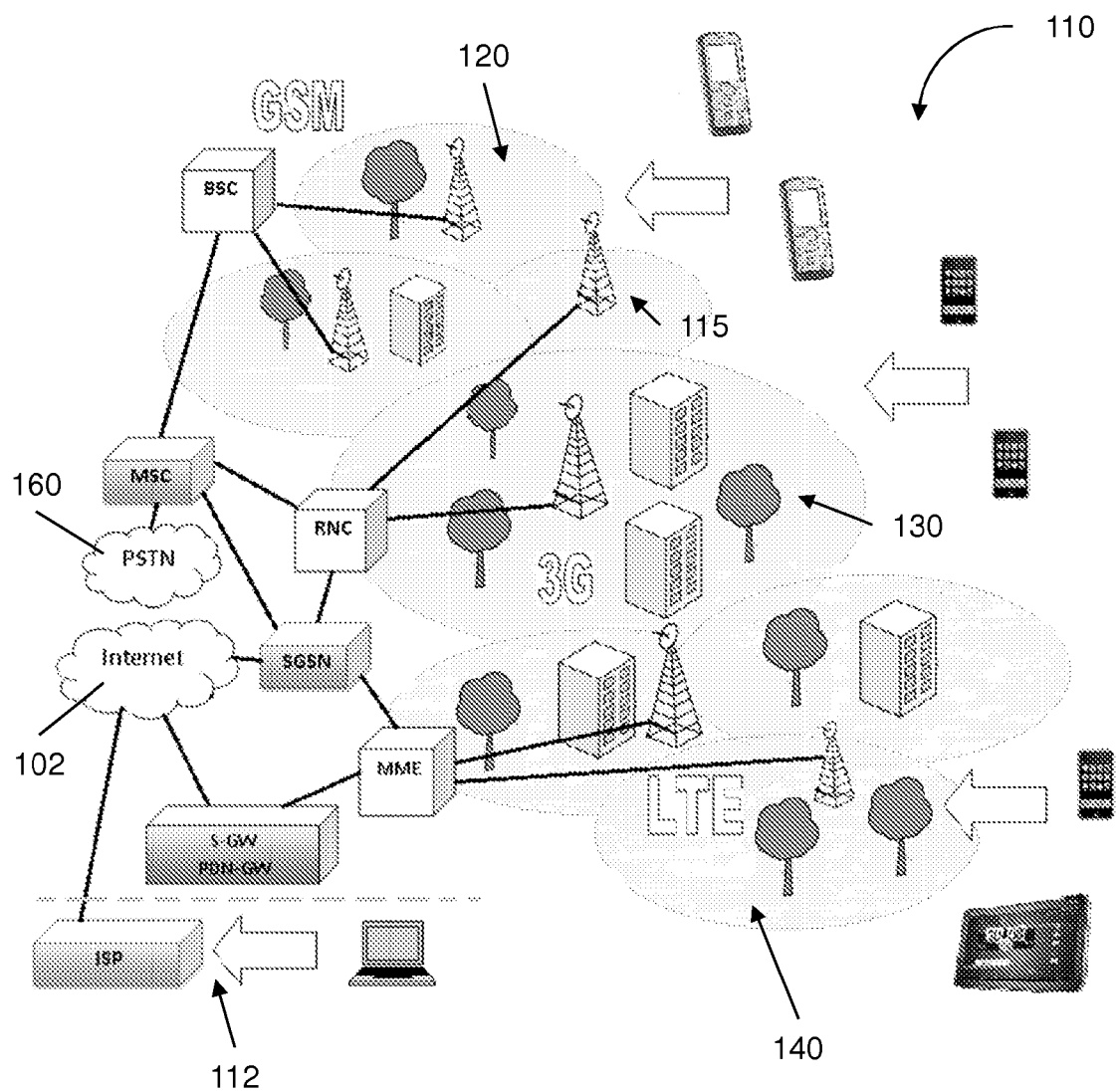
FIG. 1 depicts an illustrative embodiment of an architecture for a network for interacting with mobile devices.

The subject disclosure describes, among other things, illustrative embodiments of a server and a method for scheduling transmission of data (e.g. data packets for presentation of media content) to a client device. In one or more embodiments, data transmissions over a network, in fulfillment of requests received from a mobile device communicatively coupled to the network, can be managed (e.g., scheduled and/or rescheduled) according to various factors, such as one or more of predicted power states of a mobile device, network performance characteristics, historical network data, and so forth. In one or more embodiments, the performance characteristics can be used for predicting future characteristics of a network. In one embodiment, some or all of the future characteristics can be predicted for network segments of a network where the network segments are portions of the network along, or otherwise associated with, a trajectory of the mobile device. The future characteristics can include future transport characteristics (e.g., predicted network traffic, predicted jitter, predicted available bandwidth, and so forth) and/or future segment characteristics (e.g., future availability of network elements of the network segments).

In one or more embodiments, the predicted future power state of a mobile device can be based on monitoring of power state transitions of the mobile device. In one or more embodiments, a transition between a high-power state and a low-power state is predicted based on a first elapsed time from receiving another transmission request or a second elapsed time from transmitting a second data packet. In one or more embodiments, the performance characteristics can include historical performance data indexed by a time of day. In one or more embodiments, location information and movement information for the mobile device are obtained by monitoring communication with the mobile device, and the trajectory of the mobile device is determined based on the location information and the movement information. In one or more embodiments, a target time for fulfilling a transmission request can be determined based on reducing a degradation in a viewing quality of media content to be displayed by the mobile device, where the trajectory of the mobile device is on a path having network elements that provide varying transmission rates to the mobile device.

Other embodiments are included in the subject disclosure.

The exemplary embodiments described herein are related to, and can be combined with or replaced by, methods and/or components described in U.S. application Ser. No. 14/092,092, entitled "CLIENT-SIDE SCHEDULING FOR MEDIA TRANSMISSIONS ACCORDING TO CLIENT DEVICE STATES", the disclosure of which is hereby incorporated by reference.

One embodiment of the subject disclosure includes a system having a memory to store instructions and a controller coupled to the memory. The controller, responsive to executing the instructions, can perform operations including obtaining performance characteristics for network segments of a network. The network segments can be selected from a group of network segments based on a trajectory of a mobile device communicatively coupled to the network. The controller can predict a future transport characteristic and a future segment characteristic for the network segments based on the performance characteristics. The future segment characteristic may not be associated with a non-selected network segment of the group of network segments. The controller can receive a request from the mobile device for transmission of a data packet over the network. The controller can predict a future power state of the mobile device, based on monitoring information for a power state of the mobile device. The controller can determine a target time for fulfilling the request. The target time can be determined based on the future power state of the mobile device, the future transport characteristic and the future segment characteristic. The controller can schedule a time for fulfilling the request according to the target time.

One embodiment of the subject disclosure includes a computer-readable storage device comprising executable instructions which, responsive to being executed by a processor of a server, cause the processor to perform operations including obtaining performance characteristics of network segments of a network. The network segments can be selected from a group of network segments of the network, based on a trajectory of a mobile device communicatively coupled to the network. The operations can include monitoring power state transitions of the mobile device and predicting a future power state of the mobile device based on the monitoring of the power state transitions. The operations can include determining a target time for fulfilling a request for transmission of a data packet to the mobile device over the network. The target time can be determined based on the performance characteristics for the network segments and the future power state of the mobile device. The operations can include scheduling a time for fulfilling the request according to the target time.

One embodiment of the subject disclosure is a method including monitoring, by a server comprising a processor, performance characteristics of network segments of a network. The network segments can be selected from a group of network segments of the network, based on a trajectory of a mobile device communicatively coupled to the network. The method can include monitoring, by the server, power state transitions of the mobile device. The method can include predicting, by the server, a future power state of the mobile device based on the monitoring of the power state transitions. The predicting of the future power state can be based on determining a first elapsed time from receiving a first request from the mobile device for transmission or a second elapsed time from transmitting a first data packet. The method can include determining, by the server, a target time for transmission of a second data packet over the network. The target time can be determined based on the performance characteristics for the network segments and based on the future power state of the mobile device. The method can include scheduling, by the server, a time for transmission of the second data packet according to the target time.

FIG. 1 schematically illustrates an architecture 100 for a cellular network. Mobile devices 110 can be various types of devices such as smartphones, tablets, laptops, vehicle communication systems, and so forth. The mobile devices 110 can establish an end-to-end connection established with either a Public Switched Telephone Network (PSTN) 160, in the case of voice traffic, or an internet protocol network (Internet) 102, in the case of data traffic. As shown schematically in FIG. 1, a given mobile device can move through geographic regions having different and sometimes overlapping networks with different characteristics. A mobile device accesses a network by connecting with a base station 115 belonging to that network. As shown in FIG. 1, the architecture 100 can include a Global System for Mobile Communications (GSM) network 120, a 3G network 130, and/or a Long Term Evolution (LTE) network 140. In particular, LTE specifications define an all-internet protocol architecture with voice over internet protocol (VoIP). FIG. 1 also illustrates a device accessing the network through an Internet Service Provider (ISP) broadband connection 112.

In general, a mobile device 110 that is in motion can connect with a variety of networks, or network segments of a network, and therefore receive and transmit data at different rates at different times. A network segment, as described in the exemplary embodiments, can be a portion of a network which is defined or otherwise designated based on various criteria, such as a network segment falling between particular network nodes or network elements, a network segment having a particular geographic area and/or shape, a network segment with a service region based on a particular set of network devices, and so forth. The number and configuration of the network segments making up a particular network can vary. Additionally, network segments can vary over time, such as two network segments merging into a single network segment in response to particular network devices in the network segments going offline. In the architecture 100, a network (e.g., LTE network 140) can be intermittently available at a given location.

According to an embodiment of the disclosure, a Dynamic Adaptive Streaming over HTTP (DASH) compliant server monitors power states of a client device communicatively coupled to the server via a network. As shown schematically in FIG. 2, a DASH-compliant server 201 communicates with a mobile client device 211 by a network 210 in a system 200. The server 201 monitors an individual network connection between network 210 and the client device 211 while the client device 211 moves from one location to another (e.g. along path 250 from a starting point 251 to an ending point 252). The server 201 receives requests for media segments (segments of media content—for example, packets of video data) from the client device 211.

Figure 2:
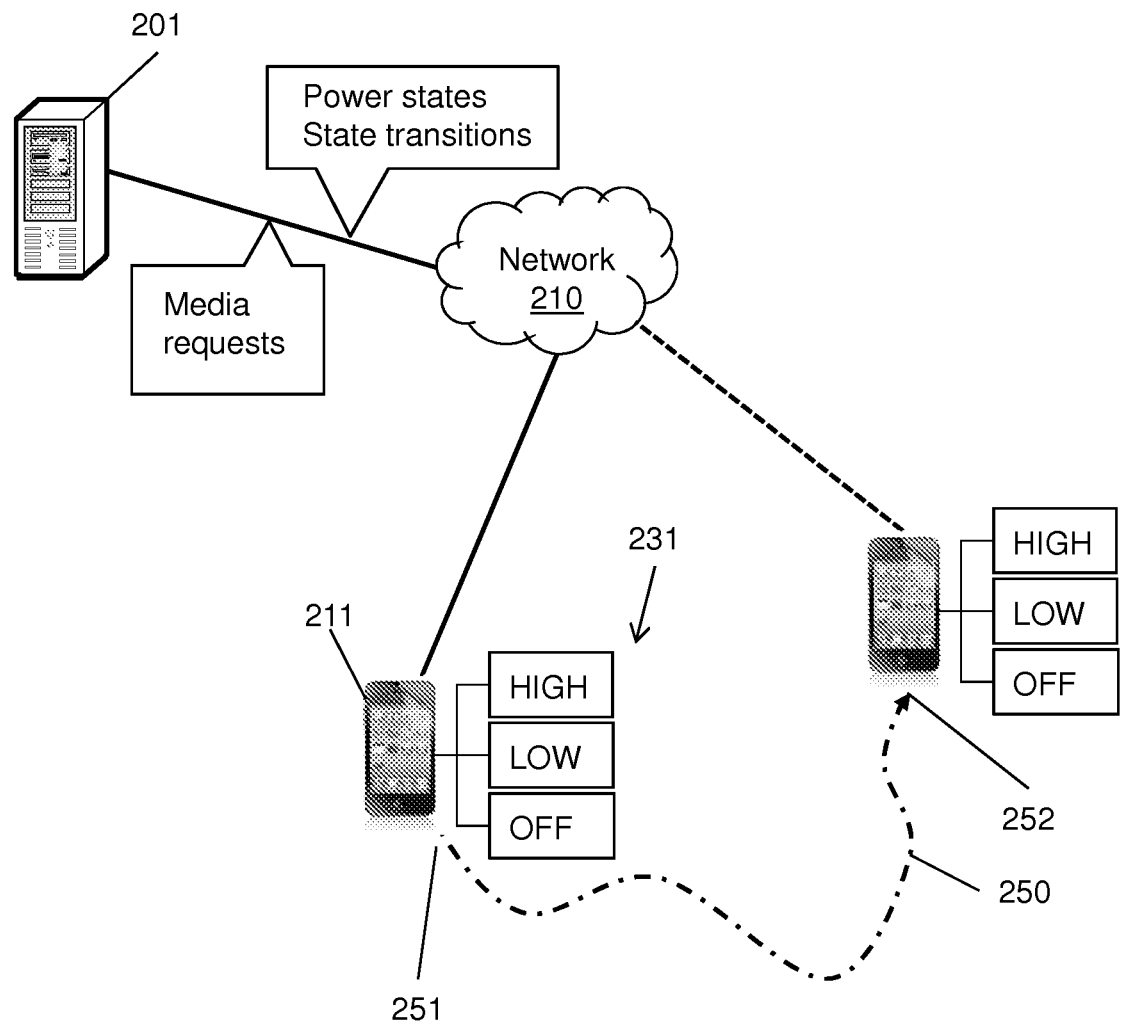
FIG. 2 depicts an illustrative embodiment of a network monitored by a server and a mobile device communicating with the network, where the mobile device transitions between power states.

As shown in FIG. 2, system 200 comprises a server and one or more clients, where a server is a device that manages requests for those clients. These clients may be endpoint devices that include the functionality of displaying video for users. However, in another embodiment of the disclosure, there is an intermediary between the server and the endpoint device. This intermediary acts as a client of the first server, but it acts as a server to the endpoint client and can be called a proxy server. Further, a number of proxy servers may be connected in to a network and any particular transmission of data from server to client may pass through more than one proxy server. Advantageously, endpoint clients can implement a fully standard and simplified data packet reception function whereas the proxy servers may implement an additional function that incorporates information about the network and is used to route data requests to proxy servers to provide for more efficient network link utilization. The particular route or set of proxy servers traversed may change during the playback of a media stream so that different packets of a particular media stream may travel along different routes. The terms "server" and "system" as used herein are intended to include proxy servers. Further, a server is understood to include a cellular base station. Additionally, a mobile device such as a smartphone may act as a server, for example when it is serving as a mobile hot spot (e.g., providing WiFi network connectivity for endpoint devices).

In this embodiment, the client device 211 has three power states 231: off, low-power and high-power. The client device 211 follows a power control procedure in which state transitions are controlled based on the current state, the time elapsed since the last change of state, and requests for media segments transmitted to the server 201.

Figure 3:
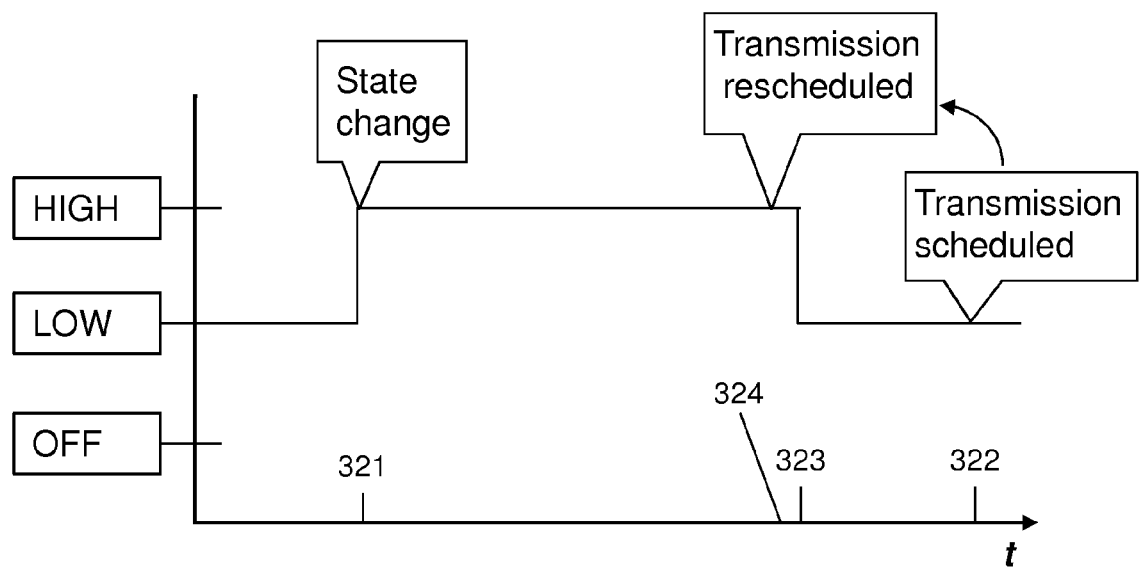
FIG. 3 schematically illustrates rescheduling a transmission from the server to the mobile device due to an anticipated power state transition at the mobile device.

Based on awareness of network performance and awareness of the power states of the client device 211, the server 201 can alter its schedule for transmitting requested media segments. FIG. 3 illustrates a time sequence 300 in which the mobile client device 211 executes state transitions, and in which the schedule for fulfillment of media requests by the server 201 is altered in response to an anticipated change of state. In the example of FIG. 3, mobile client device 211 moves from the low-power state to the high-power state at time 321. The server monitors communications from the client device, and is aware that a lack of new requests from the client device for data transport will result in a state change back to the low-power state after an elapsed time (e.g. 3 seconds after the last change of state). The server determines that the power state of the mobile device will be moved from high-power to low-power at time 323 (in this example, time 323 is 3 seconds after time 321). The server then reschedules a transmission of a media segment from time 322 to time 324 (which is prior to time 323), so that the client device 211 can receive the transmission while avoiding the delay and power consumption incurred in changing states.

Figure 4:
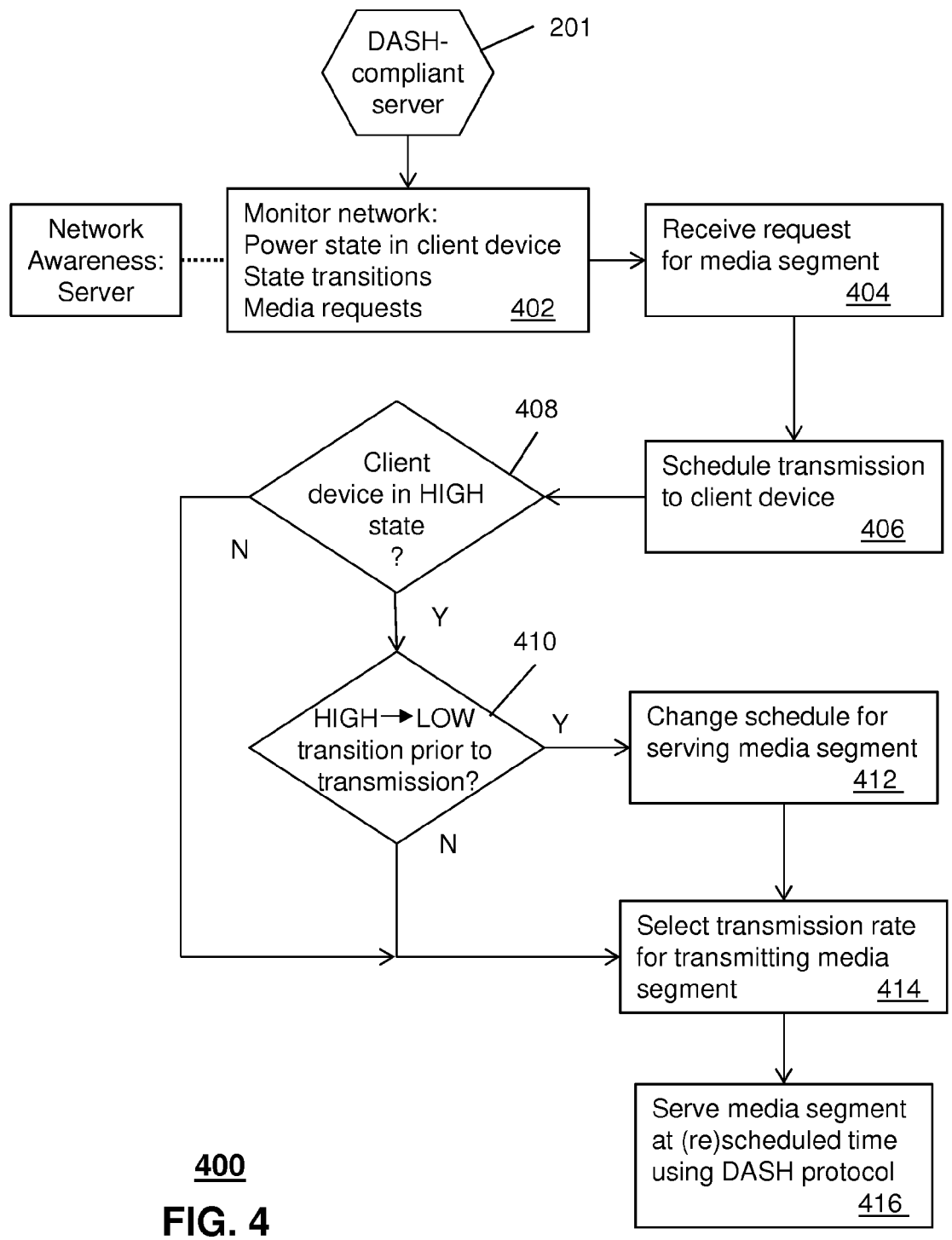
FIG. 4 is a flowchart illustrating a procedure for server-side scheduling of transmission of media segments to a client device based on power state transitions of the client device, in accordance with an embodiment of the disclosure.

FIG. 4 is a flowchart illustrating a procedure 400 for server-side scheduling of transmission of media segments to a client device based on power state transitions of the client device, in accordance with an embodiment of the disclosure. A DASH-compliant server (e.g. server 201 shown in FIG. 2) monitors a network and monitors power states and state transitions in a client device communicatively coupled to the server via the network (step 402). The server receives a request from the client device for a media segment (step 404), and then schedules transmission of the media segment to the client device (step 406). The server determines whether the client device is in the high-power state (step 408). If the client device is in the low-power state, the server will transmit the media segment at the scheduled time (step 414), (In this embodiment, transmitting the media segment instigates a transition to the high-power state so that the client device can receive and process the media segment.) If the client device is in the high-power state, the server determines (step 410) whether an anticipated transition to the low-power state will occur before the scheduled transmission. If so, the server reschedules the transmission of the media segment (step 412) so that the client device can receive the media segment while in the high-power state, and thus avoid having to perform another power state transition. The server selects a transmission rate for transmission of the media segment to the mobile device (step 414), responsive to detecting the time for fulfilling the request. The media segment is then transmitted at the scheduled (or rescheduled) time using the dynamic adaptive streaming over hypertext transfer protocol (step 416).

Figure 5:
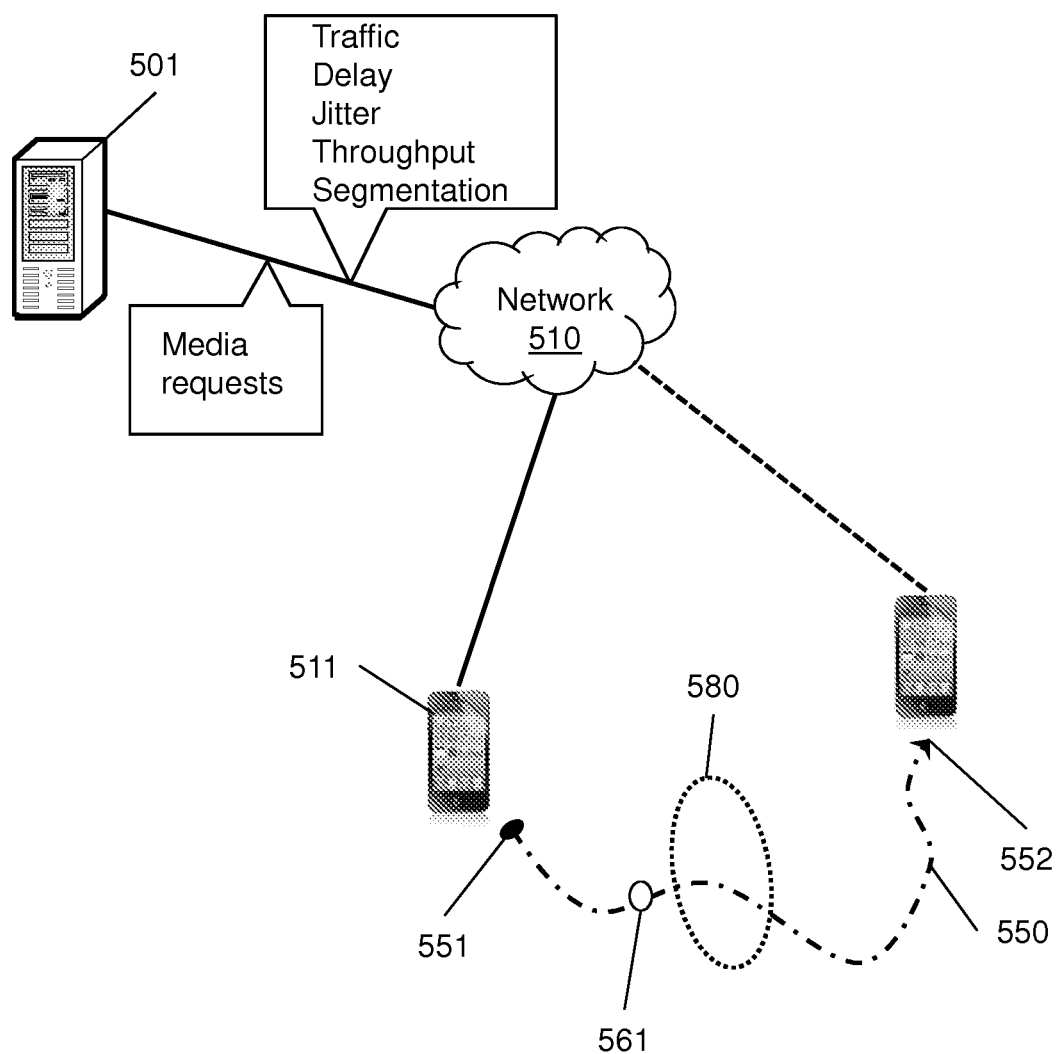
FIG. 5 depicts an illustrative embodiment of a network monitored by a server and a mobile device moving between areas of differing network capabilities.

According to another embodiment of the disclosure, shown schematically in FIG. 5, network performance in a system 500 can be evaluated by measuring traffic, delays, jitter, throughput or a combination thereof. In this embodiment, an additional server function evaluates characteristics of network segments (wired segment, wireless segment, etc.) which can provide information regarding network performance. In some embodiments, network performance is described in terms of network throughput, but the disclosure is not so limited.

The server 501 can monitor an individual network connection (for example, a connection between network 510 and a client device 511) or monitor aggregated network transport data. The server 501 receives requests for media segments (segments of media content—for example, packets of video data) from the client device 511 via the network 510. The server 501 can alter the service time for video packet requests based on information about the transport characteristics.

In an embodiment, the individual network connection with the client device 511 is monitored while the client device 511 moves from one location to another (e.g. along a path 550 from a starting point 551 to an ending point 552). The performance of the network with respect to the client device 511 can vary with movement of the device. The server 501 can predict a future location of the client device 511 based on a current location and the trajectory of the client device 511. Server 501 can estimate network performance based on anticipated motion of the client device for some period of time referred to as the look-ahead time.

Based on awareness of network performance and awareness of the trajectory of the client device 511, the server 501 can alter its schedule for transmitting requested media segments. For example, as shown schematically in FIG. 5, when the client device 511 is at location 561, the server 501 can predict that the client device will enter a hotspot 580 where network performance better than in the current location is available, including a higher packet transmission rate. The server 501 can delay transmission of a requested media segment to client device 511 until client device 511 has entered the hotspot 580.

Figure 6:
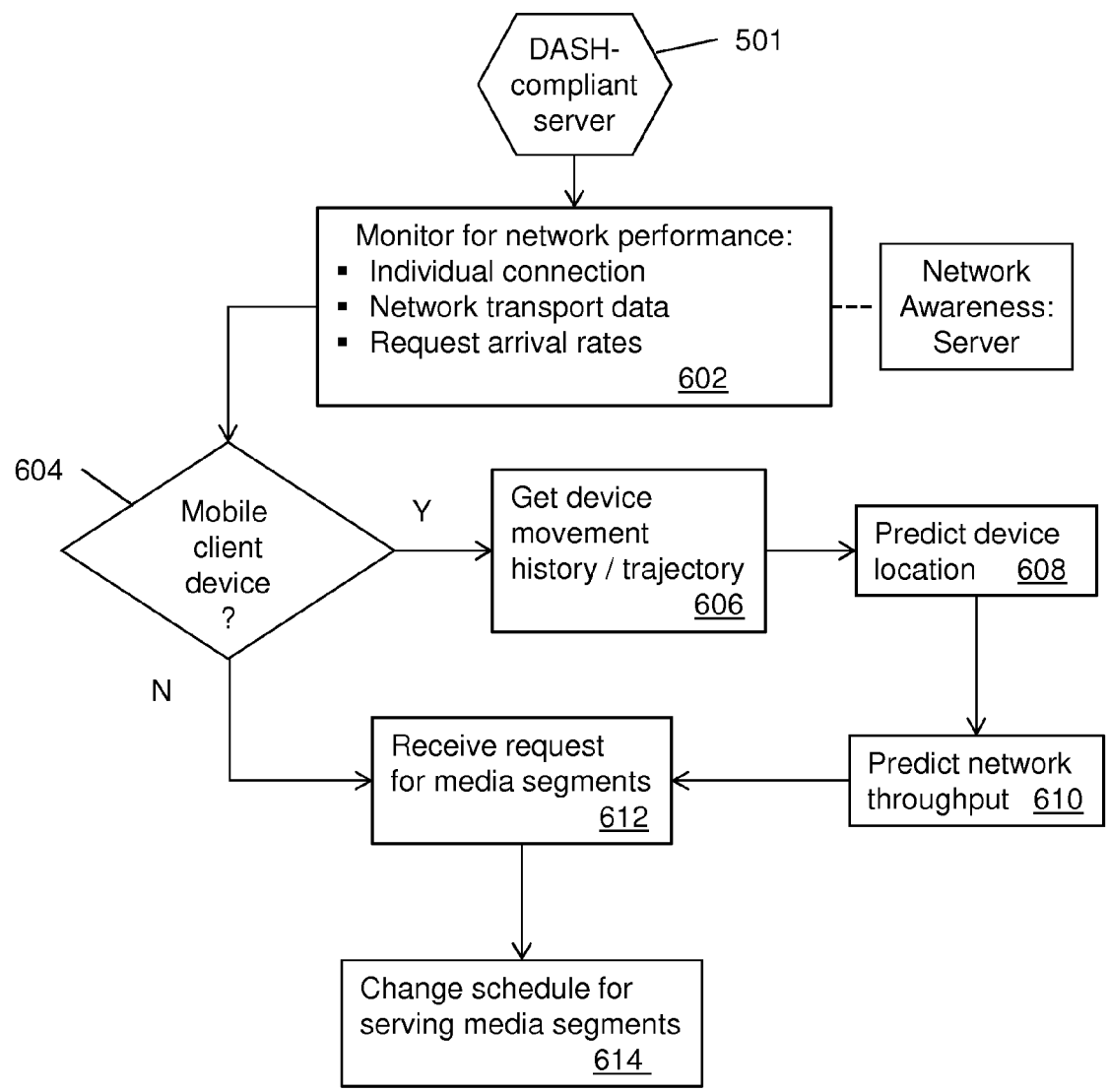
FIG. 6 is a flowchart illustrating a procedure for server-side scheduling of transmission of media segments to a client device based on movement of the client device, in accordance with an embodiment of the disclosure.

FIG. 6 is a flowchart showing a procedure 600 for server-side scheduling of media transmissions, in accordance with an embodiment of the disclosure. The network is monitored (step 602) to obtain information regarding the network throughput. In an embodiment, this can be done by monitoring an individual connection (a particular DASH session). In an alternative embodiment, the server may monitor the rate at which media requests arrive as part of a standard DASH session and infer information about the network throughput. In yet another embodiment, information regarding network throughput can be determined based on engineering designs of the deployed network between the client and the server. As shown schematically in FIG. 6, network intelligence (also termed network awareness) resides with the server 501.

Network throughput at a future time can be inferred based on an anticipated trajectory of a moving mobile client device. If the client device is mobile (step 604), the server can use the movement history (including the current location) of the client device and its trajectory (step 606) to predict a future location of the client device (step 608). The future network throughput is predicted based on the predicted location (step 610). In the case of a mobile client device, historical network throughput data for the particular time of day and day of week or year can also be used to estimate network performance. Alternatively, dynamically updated network throughput information can be derived by monitoring performance of data transport sessions that are moving with similar trajectories coincident with the client device in question.

The server receives requests for media segments (step 612) from the client device. Network throughput will typically vary with time and/or the location of the client device. The server's schedule for providing media segments is altered accordingly (step 614).

The location of a moving client device can be predicted for some time in the future (look-ahead time). It will be appreciated that the look-ahead time depends on several factors, including (for example) buffering and file sizes at the server and the speed of the moving device.

Figure 7:
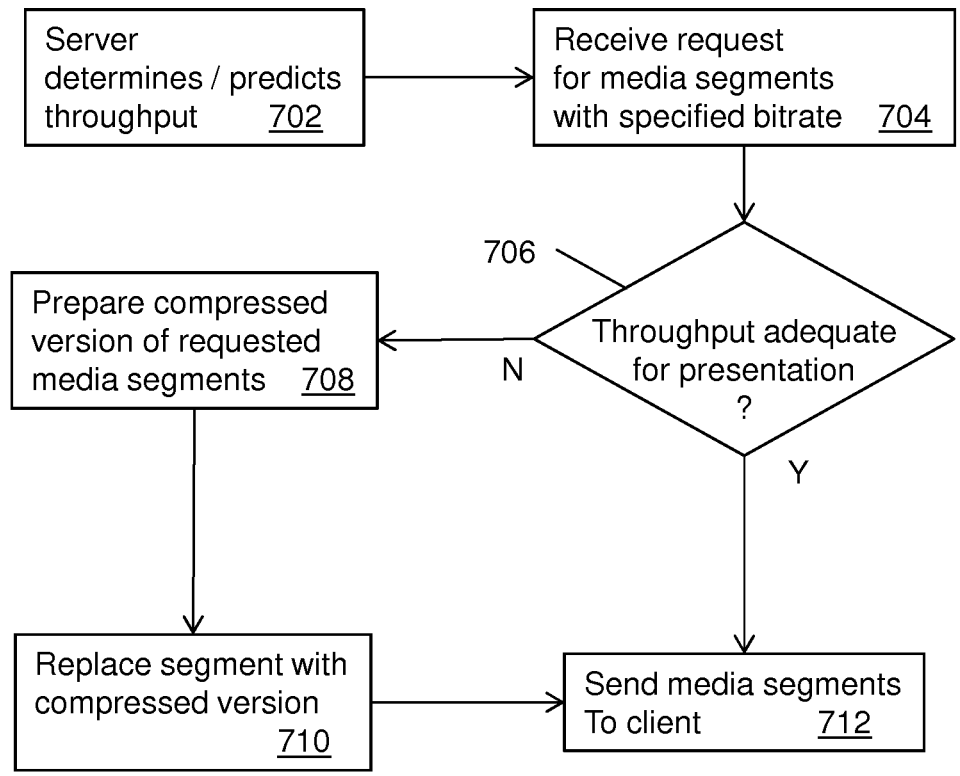
FIG. 7 is a flowchart illustrating transmission of alternative bit rate representations of media segments, in accordance with an embodiment of the disclosure.

In the embodiments described with reference to FIG. 6, the server can alter its schedule to increase its request processing time (that is, delay processing of requests). In another embodiment, network performance can be improved by offering alternative bit-rate representations of media segments at the server. FIG. 7 is a flowchart illustrating a procedure for altering the bit-rate representation of a media segment. In step 702, the server obtains information regarding a present (or predicted) network throughput. The server receives a request (step 704) for a media segment with a specified bitrate. The server determines (step 706) whether the throughput is (or will be) adequate to support presentation of the requested media segment. If not, the server prepares a compressed version of the media segment (step 708) and replaces the segment with the compressed version (step 710). The compressed version is then sent to the client (step 712) to fulfill the request.

For example, if the client device is moving through a region where network throughput is low, the client device may request a low-bitrate encoded segment. However, the server may determine that the requested representation still would not be at a bitrate low enough to support the uninterrupted playback of the video, given the information that the server has been able to obtain about the network throughput. The server may then replace the segment with a more compressed version of the media segment. Preparation of the media segments can be done dynamically, or in anticipation of the client device moving into a region where network performance is known to be worse than at the current location.

Figure 8:
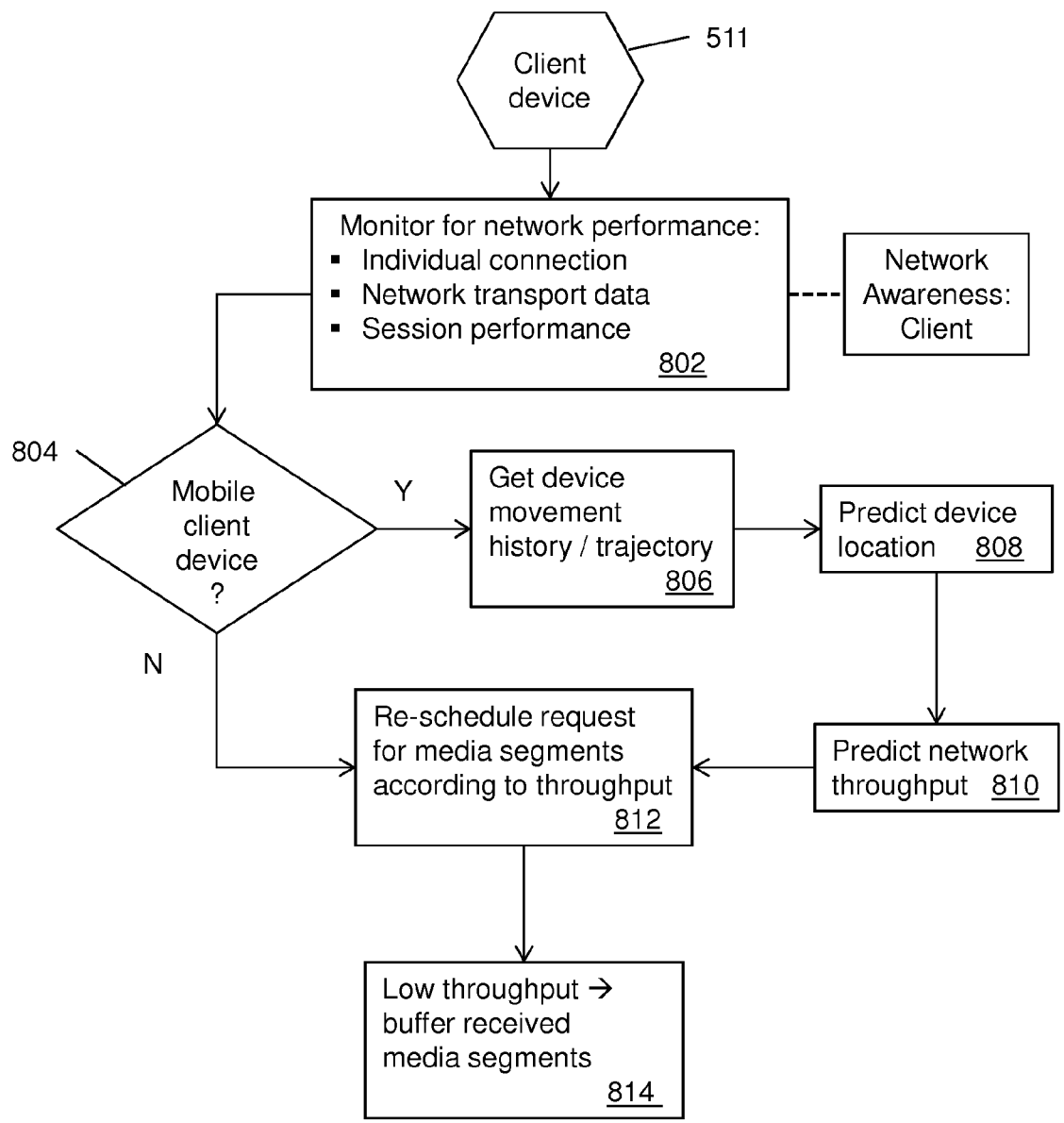
FIG. 8 is a flowchart illustrating a procedure in which a client having network awareness schedules requests for media segments, according to an embodiment of the disclosure.

FIG. 8 is a flowchart showing a procedure 800 wherein the network intelligence (network awareness) is moved from the server to the client device. In an embodiment, the client obtains information regarding the network (step 802). If the client device is mobile (step 804), the client device can use its movement history (including the current location) and its trajectory (step 806) to predict a future location for the client device (step 808). The future network throughput is predicted based on the predicted location (step 810). In this embodiment, the client device has location awareness in addition to network awareness.

The client device then alters its requests for media segments according to the updated network throughput (step 812). If the anticipated throughput is lower than the current throughput, the client device can request additional segments and buffer them in order to support continuous playback (step 814). For example, if a user (carrying a client device) in a car is headed toward a region of low throughput, the client device can request a larger-than-normal number of media packets (at a lower-than-normal bitrate in order to keep the average bitrate reasonably constant) and buffer those media packets locally such that the media will continue to play as the car moves across the region. It will be appreciated that obtaining segments of media content before they are needed for presentation and buffering those segments permits uninterrupted delivery of the media content, particularly in situations involving heterogeneous networks—that is, where the device must communicate with several different networks of varying characteristics to obtain and present a media program.

Figure 9:
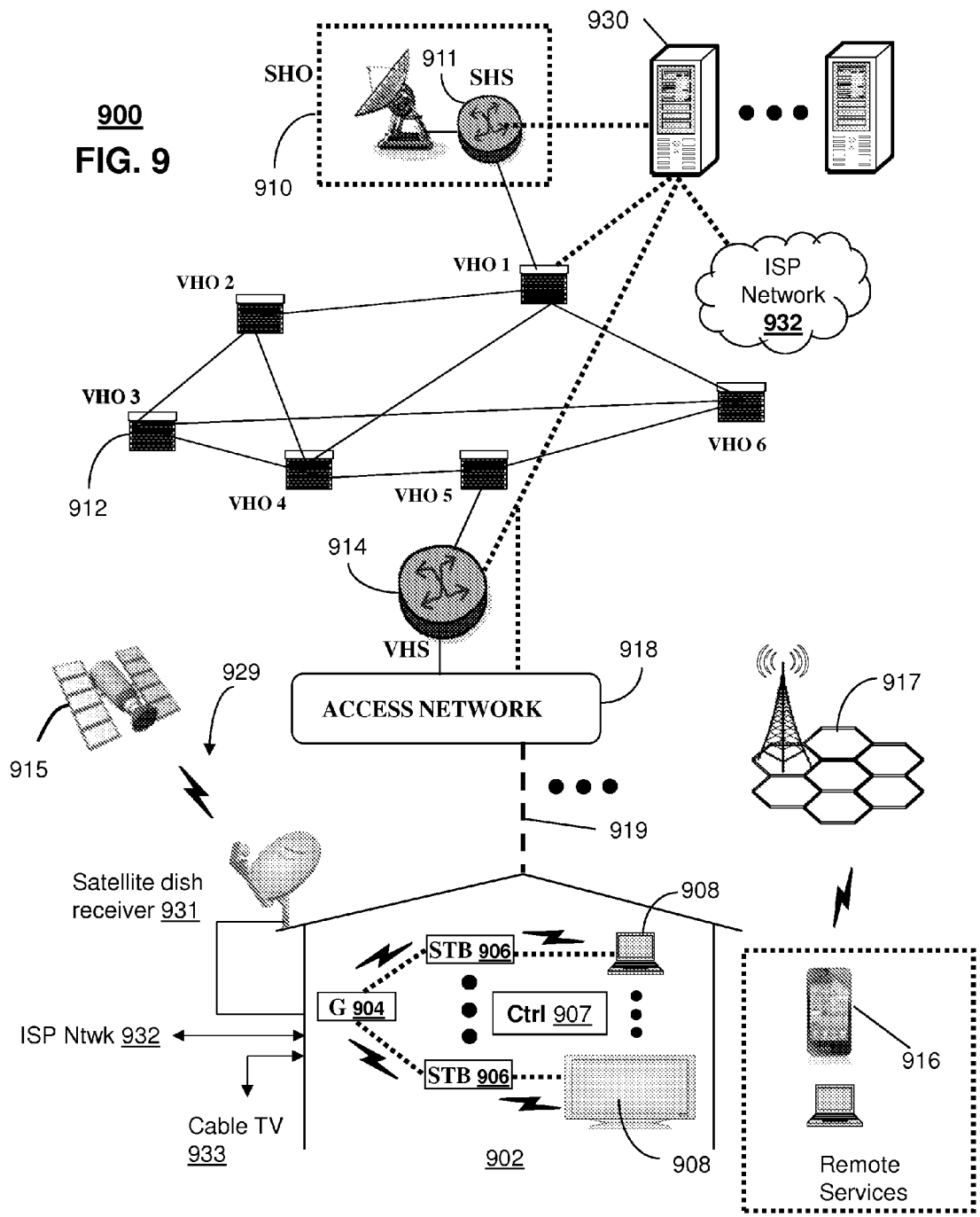
FIG. 9 depicts an illustrative embodiment of a communication system including a wireless communication network.

FIG. 9 depicts an illustrative embodiment of a communication system 900 for delivering media content. The communication system 900 can represent an Internet Protocol Television (IPTV) media system. Communication system 900 can be overlaid or operably coupled with the system 200 as another representative embodiment of communication system 900. As detailed below, the system 900 comprises a memory to store executable instructions that can be executed by a controller coupled to the memory. The controller, responsive to executing the instructions, can perform operations. The operations include obtaining (e.g. by a server 930) performance characteristics for network segments of a network. The network segments can be selected from a group of network segments based on a trajectory of a mobile device communicatively coupled to the network (e.g. a trajectory of mobile device 916 moving between segments of network 917). The controller can predict a future transport characteristic and a future segment characteristic for the network segments based on the performance characteristics. The future segment characteristic may not be associated with a non-selected network segment of the group of network segments. The controller can receive a request from the mobile device for transmission of a data packet over the network. The controller can predict a future power state of the mobile device, based on monitoring information for a power state of the mobile device. The controller can determine a target time for fulfilling the request. The target time can be determined based on the future power state of the mobile device, the future transport characteristic and the future segment characteristic. The controller can schedule a time for fulfilling the request according to the target time.

The IPTV media system can include a super head-end office (SHO) 910 with at least one super headend office server (SHS) 911 which receives media content from satellite and/or terrestrial communication systems. Media content can represent, for example, audio content, moving image content such as 2D or 3D videos, video games, virtual reality content, still image content, and combinations thereof. The SHS server 911 can forward packets associated with the media content to one or more video head-end servers (VHS) 914 via a network of video head-end offices (VHO) 912 according to a multicast communication protocol.

The VHS 914 can distribute multimedia broadcast content via an access network 918 to commercial and/or residential buildings 902 housing a gateway 904 (such as a residential or commercial gateway). The access network 918 can represent a group of digital subscriber line access multiplexers (DSLAMs) located in a central office or a service area interface that provide broadband services over fiber optical links or copper twisted pairs 919 to buildings 902. The gateway 904 can use communication technology to distribute broadcast signals to media processors 906 such as Set-Top Boxes (STBs) which in turn present broadcast channels to media devices 908 such as computers or television sets managed in some instances by a media controller 907 (such as an infrared or RF remote controller).

The gateway 904, the media processors 906, and media devices 908 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies (Bluetooth® and ZigBee® are trademarks registered by the Bluetooth Special Interest Group and the ZigBee Alliance, respectively). By way of these interfaces, unicast communications can also be invoked between the media processors 906 and subsystems of the IPTV media system for services such as video-on-demand (VoD), browsing an electronic programming guide (EPG), or other infrastructure services.

A satellite broadcast television system 929 can be used in the media system of FIG. 9. The satellite broadcast television system can be overlaid, operably coupled with, or replace the IPTV system as another representative embodiment of communication system 900. In this embodiment, signals transmitted by a satellite 915 that include media content can be received by a satellite dish receiver 931 coupled to the building 902. Modulated signals received by the satellite dish receiver 931 can be transferred to the media processors 906 for demodulating, decoding, encoding, and/or distributing broadcast channels to the media devices 908. The media processors 906 can be equipped with a broadband port to an Internet Service Provider (ISP) network 932 to enable interactive services such as VoD and EPG as described above.

In yet another embodiment, an analog or digital cable broadcast distribution system such as a cable TV system 933 can be overlaid, operably coupled with, or replace the IPTV system and/or the satellite TV system as another representative embodiment of the communication system 900. In this embodiment, the cable TV system 933 can provide Internet, telephony, and interactive media services.

The subject disclosure can apply to other present or next generation over-the-air and/or landline media content services systems.

Some of the network elements of the IPTV media system can be coupled to one or more computing devices 930, a portion of which can operate as a web server for providing web portal services over the ISP network 932 to wireline media devices 908 or wireless communication devices 916.

Communication system 900 can also provide for all or a portion of the computing devices 930 to use computing and communication technology to perform server-side scheduling, which can include among other things, fulfilling requests for media segments in accordance with network characteristics (e.g. network throughput). The media processors 906 and wireless communication devices 916 can be provisioned with software functions to utilize the services of server 930.

Multiple forms of media services can be offered to media devices over landline technologies such as those described above. Additionally, media services can be offered to media devices by way of a wireless access base station 917 operating according to wireless access protocols, such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 10:
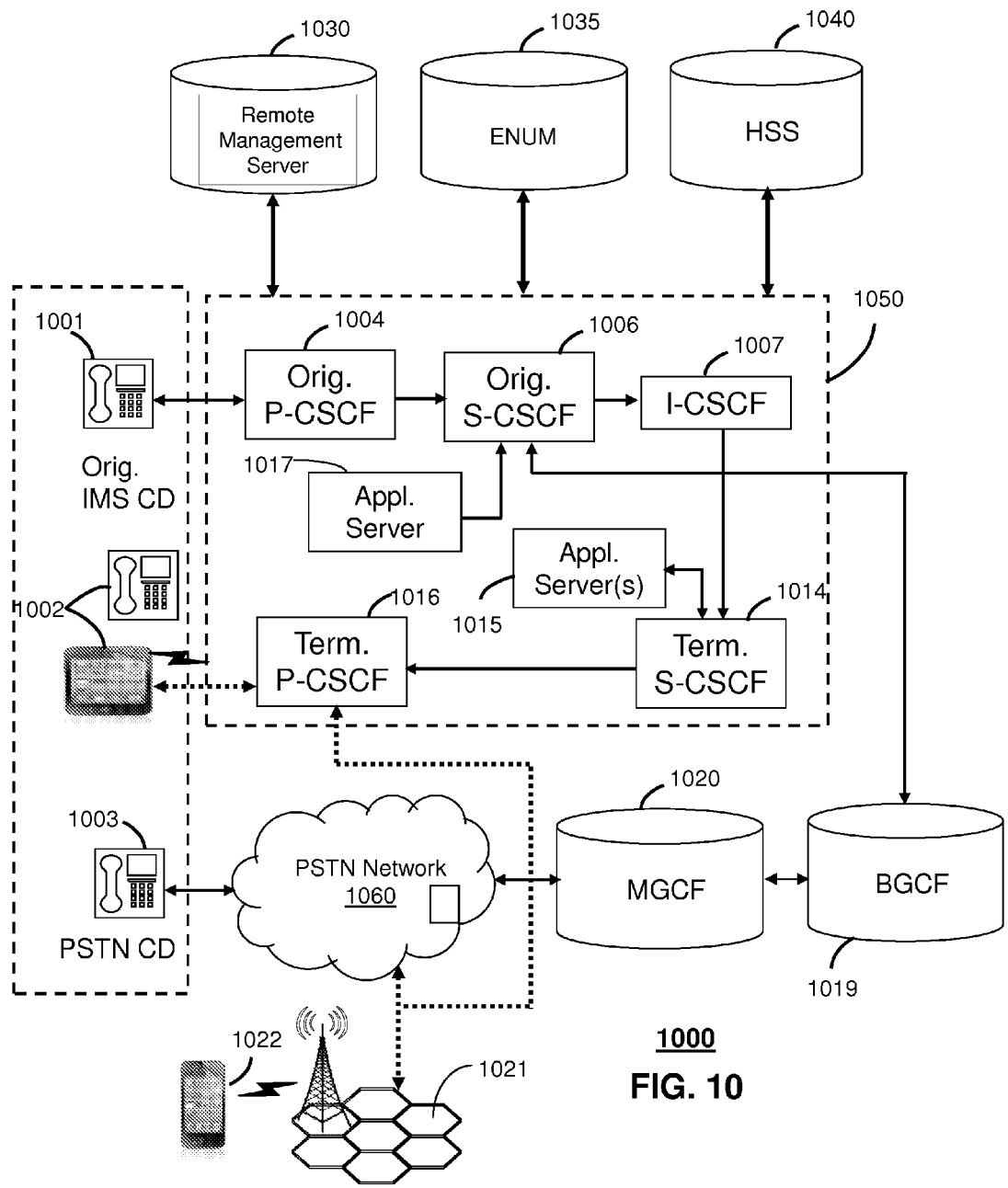
FIG. 10 depicts an illustrative embodiment of a communication system including telephone networks.

FIG. 10 depicts an illustrative embodiment of a communication system 1000 employing an IP Multimedia Subsystem (IMS) network architecture to facilitate the combined services of circuit-switched and packet-switched systems. Communication system 1000 can be overlaid or operably coupled with system 200 and communication system 900 as another representative embodiment of communication system 900. In particular, communication system 1000 can be configured to perform a method including monitoring, by a server comprising a processor, performance characteristics of network segments of a network. The network segments can be selected from a group of network segments of the network, based on a trajectory of a mobile device communicatively coupled to the network. The method can include monitoring, by the server, power state transitions of the mobile device. The method can include predicting, by the server, a future power state of the mobile device based on the monitoring of the power state transitions. The predicting of the future power state can be based on determining a first elapsed time from receiving a first request from the mobile device for transmission or a second elapsed time from transmitting a first data packet. The method can include determining, by the server, a target time for transmission of a second data packet over the network. The target time can be determined based on the performance characteristics for the network segments and based on the future power state of the mobile device. The method can include scheduling, by the server, a time for transmission of the second data packet according to the target time.

Communication system 1000 can comprise a Home Subscriber Server (HSS) 1040, a tElephone NUmber Mapping (ENUM) server 1035, a management server 1030, and other network elements of an IMS network 1050. The IMS network 1050 can establish communications between IMS-compliant communication devices (CDs) 1001, 1002, Public Switched Telephone Network (PSTN) CDs 1003, and combinations thereof by way of a Media Gateway Control Function (MGCF) 1020 coupled to a PSTN network 1060. The MGCF 1020 need not be used when a communication session involves IMS CD to IMS CD communications. A communication session involving at least one PSTN CD may utilize the MGCF 1020.

IMS CDs 1001, 1002 can register with the IMS network 1050 by contacting a Proxy Call Session Control Function (P-CSCF) which communicates with an interrogating CSCF (I-CSCF), which in turn, communicates with a Serving CSCF (S-CSCF) to register the CDs with the HSS 1040. To initiate a communication session between CDs, an originating IMS CD 1001 can submit a Session Initiation Protocol (SIP INVITE) message to an originating P-CSCF 1004 which communicates with a corresponding originating S-CSCF 1006. The originating S-CSCF 1006 can submit the SIP INVITE message to one or more application servers (ASs) 1017 that can provide a variety of services to IMS subscribers.

For example, the application servers 1017 can be used to perform originating call feature treatment functions on the calling party number received by the originating S-CSCF 1006 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1006 can submit queries to the ENUM system 1035 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1007 to submit a query to the HSS 1040 to identify a terminating S-CSCF 1014 associated with a terminating IMS CD such as reference 1002. Once identified, the I-CSCF 1007 can submit the SIP INVITE message to the terminating S-CSCF 1014. The terminating S-CSCF 1014 can then identify a terminating P-CSCF 1016 associated with the terminating CD 1002. The P-CSCF 1016 may then signal the CD 1002 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 10 may be interchangeable. It is further noted that communication system 1000 can be adapted to support video conferencing. In addition, communication system 1000 can be adapted to provide the IMS CDs 1001, 1002 with the multimedia and Internet services of communication system 900 of FIG. 9.

If the terminating communication device is instead a PSTN CD such as CD 1003 (in instances where the cellular phone only supports circuit-switched voice communications), the ENUM system 1035 can respond with an unsuccessful address resolution which can cause the originating S-CSCF 1006 to forward the call to the MGCF 1020 via a Breakout Gateway Control Function (BGCF) 1019. The MGCF 1020 can then initiate the call to the terminating PSTN CD over the PSTN network 1060 to enable the calling and called parties to engage in voice and/or data communications.

It is further appreciated that the CDs of FIG. 10 can operate as wireline or wireless devices. For example, the CDs of FIG. 10 can be communicatively coupled to a cellular base station 1021, a femtocell, a WiFi router, a Digital Enhanced Cordless Telecommunications (DECT) base unit, or another suitable wireless access unit to establish communications with the IMS network 1050 of FIG. 10. The cellular access base station 1021 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 10.

Cellular phones supporting LTE can support packet-switched voice and packet-switched data communications and thus may operate as IMS-compliant mobile devices 1022. In this embodiment, the cellular base station 1021 may communicate directly with the IMS network 1050 as shown by the arrow connecting the cellular base station 1021 and the P-CSCF 1016.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 930 of FIG. 9 can be operably coupled to the second communication system 1000 for purposes similar to those described above. Server 930 can perform server-side scheduling and thereby provide media transmissions to the CDs 1001, 1002 and 1003 of FIG. 10. Server 930 can be an integral part of the application server(s) 1017, which can be adapted to the operations of the IMS network 1050.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 11:
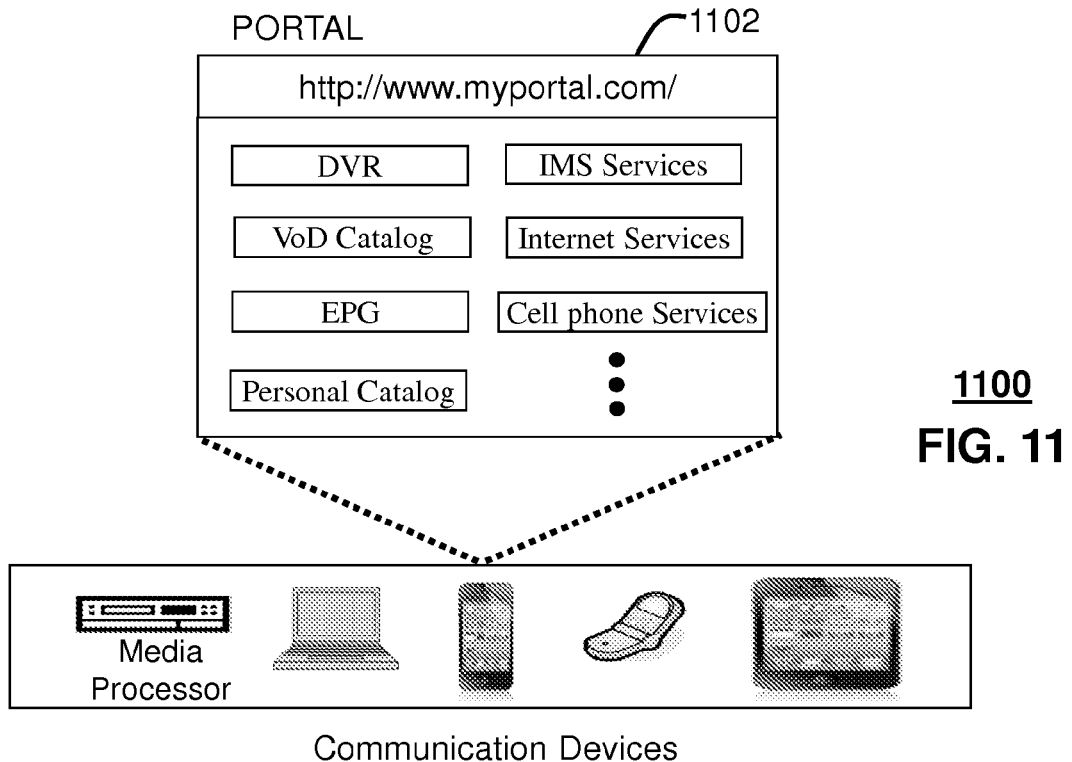
FIG. 11 depicts an illustrative embodiment of a web portal for interacting with devices included in the communication system of FIG. 7.

FIG. 11 depicts an illustrative embodiment of a web portal 1102 which can be hosted by server applications operating from the computing devices 930 of the communication system 900 illustrated in FIG. 9. Communication system 1100 can be overlaid or operably coupled with communication system 900 as another representative embodiment of the disclosure. The communication devices shown in FIG. 11 are examples of devices that can communicate with networks as shown in FIGS. 1 and 2. In an embodiment, communication system 1100 is operably coupled with communication system 900 to include a computer-readable storage device comprising computer-readable storage device comprising executable instructions which, responsive to being executed by a processor of a server (e.g. server 930), cause the processor to perform operations including obtaining performance characteristics of network segments of a network. The network segments can be selected from a group of network segments of the network, based on a trajectory of a mobile device communicatively coupled to the network. The operations can include monitoring power state transitions of the mobile device and predicting a future power state of the mobile device based on the monitoring of the power state transitions. The operations can include determining a target time for fulfilling a request for transmission of a data packet to the mobile device over the network. The target time can be determined based on the performance characteristics for the network segments and the future power state of the mobile device. The operations can include scheduling a time for fulfilling the request according to the target time.

The web portal 1102 can be used for managing services of communication systems 900-1000. A web page of the web portal 1102 can be accessed by a Uniform Resource Locator (URL) with an Internet browser using an Internet-capable communication device such as those described in FIGS. 1-2. The web portal 1102 can be configured, for example, to access a media processor 906 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 906. The web portal 1102 can also be used for provisioning IMS services described earlier, provisioning Internet services, provisioning cellular phone services, and so on.

Figure 12:
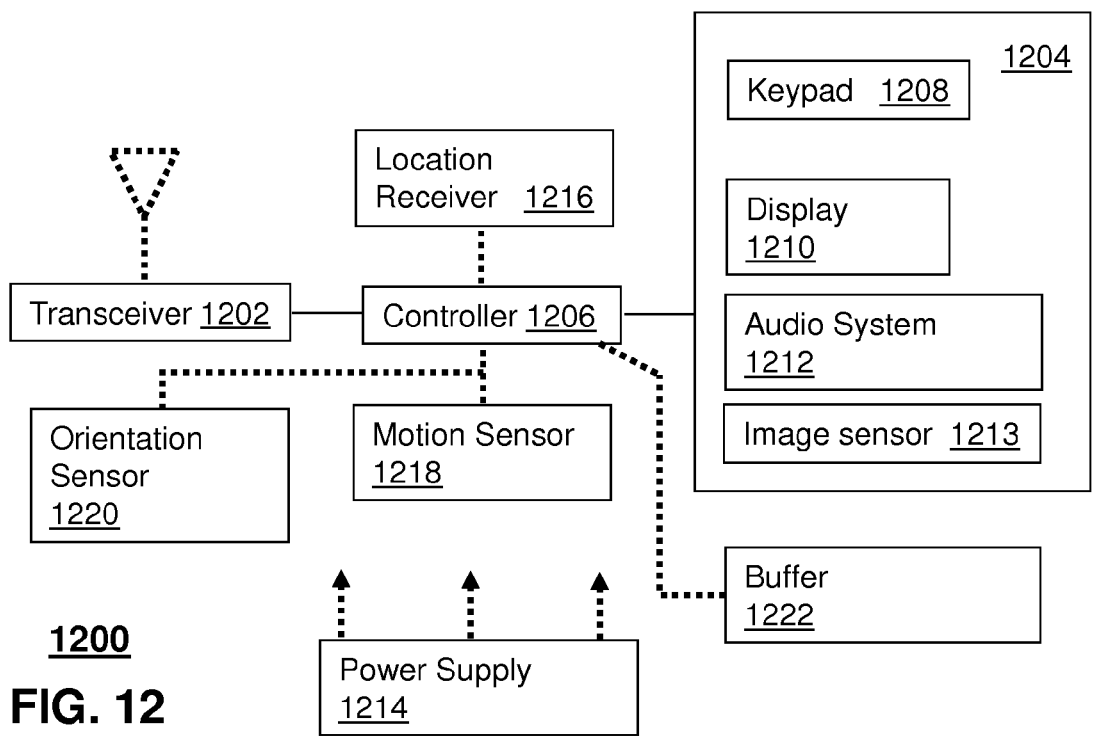
FIG. 12 depicts an illustrative embodiment of a communication device.

FIG. 12 depicts an illustrative embodiment of a communication device 1200. Communication device 1200 can serve in whole or in part as an illustrative embodiment of the devices depicted in FIGS. 1-2 and FIGS. 9-10. Communication device 1200 can be configured as part of a system (e.g. system 200) to perform a method comprising including monitoring, by a server comprising a processor, performance characteristics of network segments of a network. The network segments can be selected from a group of network segments of the network, based on a trajectory of a mobile device communicatively coupled to the network. The method can include monitoring, by the server, power state transitions of the mobile device. The method can include predicting, by the server, a future power state of the mobile device based on the monitoring of the power state transitions. The predicting of the future power state can be based on determining a first elapsed time from receiving a first request from the mobile device for transmission or a second elapsed time from transmitting a first data packet. The method can include determining, by the server, a target time for transmission of a second data packet over the network. The target time can be determined based on the performance characteristics for the network segments and based on the future power state of the mobile device. The method can include scheduling, by the server, a time for transmission of the second data packet according to the target time.

To enable these features, communication device 1200 can comprise a wireline and/or wireless transceiver 1202 (herein transceiver 1202), a user interface (UI) 1204, a power supply 1214, a location receiver 1216, a motion sensor 1218, an orientation sensor 1220, a buffer 1222, and a controller 1206 for managing operations thereof. The transceiver 1202 can support short-range or long-range wireless access technologies such as Bluetooth®, ZigBee®, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1202 can also be adapted to support circuit-switched wireline access technologies (such as PSTN), packet-switched wireline access technologies (such as TCP/IP, VoIP, etc.), and combinations thereof.

The UI 1204 can include a depressible or touch-sensitive keypad 1208 with a navigation mechanism such as a roller ball, a joystick, a mouse, or a navigation disk for manipulating operations of the communication device 1200. The keypad 1208 can be an integral part of a housing assembly of the communication device 1200 or an independent device operably coupled thereto by a tethered wireline interface (such as a USB cable) or a wireless interface supporting for example Bluetooth®. The keypad 1208 can represent a numeric keypad commonly used by phones, and/or a QWERTY keypad with alphanumeric keys. The UI 1204 can further include a display 1210 such as monochrome or color LCD (Liquid Crystal Display), OLED (Organic Light Emitting Diode) or other suitable display technology for conveying images to an end user of the communication device 1200. In an embodiment where the display 1210 is touch-sensitive, a portion or all of the keypad 1208 can be presented by way of the display 1210 with navigation features.

The display 1210 can use touch screen technology to also serve as a user interface for detecting user input. As a touch screen display, the communication device 1200 can be adapted to present a user interface with graphical user interface (GUI) elements that can be selected by a user with a touch of a finger. The touch screen display 1210 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1210 can be an integral part of the housing assembly of the communication device 1200 or an independent device communicatively coupled thereto by a tethered wireline interface (such as a cable) or a wireless interface.

The UI 1204 can also include an audio system 1212 that utilizes audio technology for conveying low volume audio (such as audio heard in proximity of a human ear) and high volume audio (such as speakerphone for hands free operation). The audio system 1212 can further include a microphone for receiving audible signals of an end user. The audio system 1212 can also be used for voice recognition applications. The UI 1204 can further include an image sensor 1213 such as a charged coupled device (CCD) camera for capturing still or moving images.

The power supply 1214 can utilize common power management technologies such as replaceable and rechargeable batteries, supply regulation technologies, and/or charging system technologies for supplying energy to the components of the communication device 1200 to facilitate long-range or short-range portable applications. Alternatively, or in combination, the charging system can utilize external power sources such as DC power supplied over a physical interface such as a USB port or other suitable tethering technologies.

The location receiver 1216 can utilize location technology such as a global positioning system (GPS) receiver capable of assisted GPS for identifying a location of the communication device 1200 based on signals generated by a constellation of GPS satellites, which can be used for facilitating location services such as navigation. The motion sensor 1218 can utilize motion sensing technology such as an accelerometer, a gyroscope, or other suitable motion sensing technology to detect motion of the communication device 1200 in three-dimensional space. The orientation sensor 1220 can utilize orientation sensing technology such as a magnetometer to detect the orientation of the communication device 1200 (north, south, west, and east, as well as combined orientations in degrees, minutes, or other suitable orientation metrics).

The communication device 1200 can use the transceiver 1202 to also determine a proximity to a cellular, WiFi, Bluetooth®, Zigbee® or other wireless access points by sensing techniques such as utilizing a received signal strength indicator (RSSI) and/or signal time of arrival (TOA) or time of flight (TOF) measurements. The controller 1206 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1200.

Other components not shown in FIG. 12 can be used in one or more embodiments of the subject disclosure. For instance, the communication device 1200 can include a reset button (not shown). The reset button can be used to reset the controller 1206 of the communication device 1200. In yet another embodiment, the communication device 1200 can also include a factory default setting button positioned, for example, below a small hole in a housing assembly of the communication device 1200 to force the communication device 1200 to re-establish factory settings. In this embodiment, a user can use a protruding object such as a pen or paper clip tip to reach into the hole and depress the default setting button. The communication device 1200 can also include a slot for adding or removing an identity module such as a Subscriber Identity Module (SIM) card. SIM cards can be used for identifying subscriber services, executing programs, storing subscriber data, and so forth.

The communication device 1200 as described herein can operate with more or less of the circuit components shown in FIG. 12. These variant embodiments can be used in one or more embodiments of the subject disclosure.

The communication device 1200 can be adapted to perform the functions of the media processor 906, the media devices 908, or the portable communication devices 916 of FIG. 9, as well as the IMS CDs 1001-1002 and PSTN CDs 1003 of FIG. 10. It will be appreciated that the communication device 1200 can also represent other devices that can operate in communication systems 900-1000 of FIGS. 9-10 such as a gaming console and a media player.

The communication device 1200 shown in FIG. 12 or portions thereof can serve as a representation of one or more of the devices of FIGS. 1-2, communication system 900, and communication system 1000.

Upon reviewing the aforementioned embodiments, it would be evident to an artisan with ordinary skill in the art that said embodiments can be modified, reduced, or enhanced without departing from the scope of the claims described below.

For example. the trajectory of a mobile device can be an actual trajectory (e.g., a mobile device of a passenger in a train can have an actual trajectory which will be along the path of the train which is known ahead of time) or a predicted trajectory (e.g., based on device location, device speed, device acceleration and/or how long the mobile device has been moving along the path). In one or more embodiments, a trajectory can be determined based on other information. For instance, historical location information can be used for determining a trajectory. As an example, historical location can indicate that a mobile device traveling through a starting point has in the past moved to an ending point along a particular path, such as when the user is commuting to work. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 13:
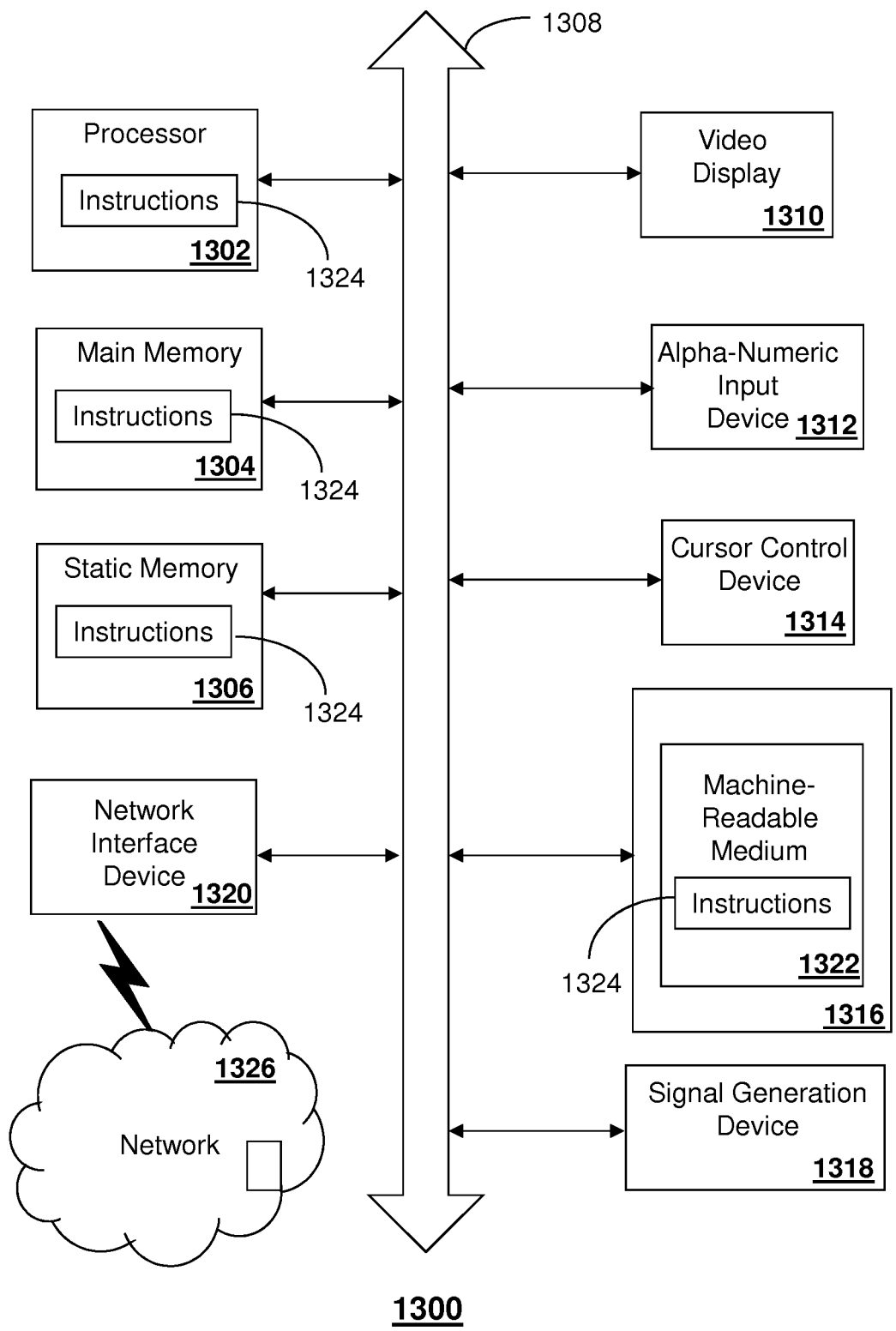
FIG. 13 is a diagrammatic representation of a machine in the form of a computer system within which a set of instructions, when executed, may cause the machine to perform any one or more of the methods described herein.

FIG. 13 depicts an exemplary diagrammatic representation of a machine in the form of a computer system 1300 within which a set of instructions, when executed, may cause the machine to perform any one or more of the methods described above. One or more instances of the machine can operate, for example, as the server 201, the mobile device 211, or the media processor 906. In some embodiments, the machine may be connected (e.g., using a network 1326) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1300 may include a processor (or controller) 1302 (e.g., a central processing unit (CPU), a graphics processing unit (GPU, or both), a main memory 1304 and a static memory 1306, which communicate with each other via a bus 1308. The computer system 1300 may further include a display unit 1310 (e.g., a liquid crystal display (LCD), a flat panel, or a solid state display. The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320. In distributed environments, the embodiments described in the subject disclosure can be adapted to utilize multiple display units 1310 controlled by two or more computer systems 1300. In this configuration, presentations described by the subject disclosure may in part be shown in a first of the display units 1310, while the remaining portion is presented in a second of the display units 1310.

The disk drive unit 1316 may include a tangible computer-readable storage medium 1322 on which is stored one or more sets of instructions (e.g., software 1324) embodying any one or more of the methods or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1322 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1300.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can include virtual processor(s). The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
    a memory that stores instructions; and
    a controller coupled to the memory, wherein responsive to executing the instructions, the controller performs operations comprising:
    obtaining performance characteristics for network segments of a network, the network segments selected from a group of network segments based on a trajectory of a mobile device communicatively coupled to the network, wherein the network segments have network elements that provide varying transmission rates to the mobile device;
    predicting a future transport characteristic and a future segment characteristic for the network segments based on the performance characteristics, wherein the future transport characteristic comprises a predicted network traffic delay and a predicted available bandwidth, and wherein the future segment characteristic comprises future availability of network elements of the network segments;
    receiving a request from the mobile device for transmission of a data packet over the network;
    determining a power state of the mobile device, wherein the power state comprises an off state, a low-power state, or a high-power state;
    predicting a future power state of the mobile device based on monitoring information for the power state of the mobile device;
    determining a target time for fulfilling the request, wherein the target time is determined based on reducing a degradation in a viewing quality of media content to be displayed by the mobile device, the future power state of the mobile device, the future transport characteristic and the future segment characteristic;
    scheduling a time for fulfilling the request according to the target time, wherein fulfilling the request comprises transmitting the data packet by the controller while the mobile device is in a high-power state; and wherein transmitting the data packet by the controller instigates a power state transition in the mobile device from a low-power state to the high-power state responsive to the power state and the future power state both being the low-power state;
    determining an anticipated power state corresponding to the target time;
    responsive to a determination that the anticipated power state is not the high-power state, determining a reschedule time for fulfilling the request corresponding to when the mobile device is predicted to be in the high-power state; and rescheduling the time for fulfilling the request according to the reschedule time, wherein the mobile device transitions from the high-power state to the low-power state after a time period from a previous power state transition.

2. The system of claim 1, wherein the determining of the anticipated power state comprises monitoring power state transitions of the mobile device and predicting a transition between the high-power state and the low-power state, wherein the transition between the high-power state and the low-power state is predicted based on a first elapsed time from receiving another transmission request or a second elapsed time from transmitting a second data packet.

3. The system of claim 1, wherein the performance characteristics for the network segments comprise historical performance data, wherein the network comprises first and second networks, wherein the mobile device is communicatively coupled with the first network and subsequently with the second network in accordance with availability of the second network, the second network being intermittently available, and wherein the operations further comprise predicting availability of the second network.

4. The system of claim 1, wherein the performance characteristics comprise historical performance data indexed by a time of day, and wherein the operations further comprise:

obtaining location information and movement information for the mobile device, based on monitoring communication with the mobile device;

determining the trajectory of the mobile device based on the location information and the movement information; and wherein the obtaining of the performance characteristics for the network segments comprises obtaining transport characteristics of the network via a network map server remote from the mobile device.

5. The system claim 4, wherein the transport characteristics comprise network traffic and jitter, and wherein the future segment characteristic comprises an availability for each of the group of network segments.

6. The system of claim 1, wherein the predicting of the future power state comprises monitoring an elapsed time from receiving a second request for transmission of a second data packet, wherein the second request is initiated by an application being executed at the mobile device, and wherein the application is not associated with the request for transmission of the data packet.

7. The system of claim 1, wherein the predicting of the future power state comprises monitoring an elapsed time from transmitting a second data packet, wherein the second data packet is associated with an application being executed at the mobile device, and wherein the application is not associated with the request for transmission of the data packet.

8. A computer-readable storage device comprising executable instructions which, responsive to being executed by a processor of a server, cause the processor to perform operations comprising:

obtaining performance characteristics of network segments of a network, the network segments selected from a group of network segments of the network based on a trajectory of a mobile device communicatively coupled to the network, wherein the network segments have network elements that provide varying transmission rates to the mobile device;

monitoring power state transitions of the mobile device;

determining a power state of the mobile device, wherein the power state comprises an off state, a low-power state, or a high-power state;

predicting a future power state of the mobile device based on the monitoring of the power state transitions;

determining a target time for fulfilling a request for transmission of a data packet to the mobile device over the network, the target time being determined based on reducing a degradation in a viewing quality of media content to be displayed by the mobile device, the performance characteristics for the network segments, and the future power state of the mobile device;

scheduling a time for fulfilling the request according to the target time, wherein fulfilling the request comprises transmitting the data packet while the mobile device is in a high-power state, and wherein transmitting the data packet instigates a power state transition in the mobile device from a low-power state to the high-power state responsive to the power state and the future power state both being the low-power state;

determining an anticipated power state corresponding to the target time;

responsive to a determination that the anticipated power state is not the high-power state, determining a reschedule time for fulfilling the request corresponding to when the mobile device is predicted to be in the high-power state; and rescheduling the time for fulfilling the request according to the reschedule time, wherein the mobile device transitions from the high-power state to the low-power state after a time period from a previous power state transition.

9. The computer-readable storage device of claim 8, wherein the operations further comprise:

responsive to the anticipated power state not being the high-power state, rescheduling the transmission of the data packet to the reschedule time.

10. The computer-readable storage device of claim 8, wherein the predicting of the future power state of the mobile device is based on determining a first elapsed time from receiving a second request for transmission or a second elapsed time from transmitting a second data packet.

11. The computer-readable storage device of claim 10, wherein the request for transmission is associated with a first application being executed by the mobile device, and wherein the second request for transmission is associated with a second application being executed by the mobile device.

12. The computer-readable storage device of claim 10, wherein the operations further comprise transmitting the data packet for presentation of media content associated with the data packet at the mobile device, wherein the transmission of the data packet is associated with a first application being executed by the mobile device, and wherein the transmitting of the second data packet is associated with a second application being executed by the mobile device.

13. A method comprising:

monitoring, by a server comprising a processor, performance characteristics of network segments of a network, the network segments selected from a group of network segments of the network based on a trajectory of a mobile device communicatively coupled to the network, wherein the network segments have network elements that provide varying transmission rates to the mobile device;

monitoring, by the server, power state transitions of the mobile device;

determining, by the server, a power state of the mobile device, wherein the power state comprises an off state, a low-power state, or a high-power state;

predicting, by the server, a future power state of the mobile device based on the monitoring of the power state transitions and based on determining a first elapsed time from receiving a first request from the mobile device for transmission or a second elapsed time from transmitting a first data packet;

determining, by the server, a target time for transmission of a second data packet over the network, the target time being determined based on reducing a degradation in a viewing quality of media content to be displayed by the mobile device, the performance characteristics for the network segments, and the future power state of the mobile device;

scheduling, by the server, a time for transmission of the second data packet according to the target time, wherein the transmission of the second data packet is performed while the mobile device is in a high-power state, and wherein transmission of the second data packet instigates a power state transition in the mobile device from a low-power state to the high-power state responsive to the power state and the future power state both being the low-power state, determining, by the server, an anticipated power state corresponding to the target time;

determining, by the server and responsive to a determination that the anticipated power state is not the high-power state, a reschedule time for fulfilling the request corresponding to when the mobile device is predicted to be in the high-power state; and rescheduling, by the server, the time for fulfilling the request according to the reschedule time, wherein the mobile device transitions from the high-power state to the low-power state after a time period from a previous power state transition.

14. The method of claim 13, further comprising:

transmitting the second data packet over the network to the mobile device for buffering by the mobile device and presentation of media content associated with the second data packet at the mobile device; and determining the trajectory of the mobile device based on historical location data associated with the mobile device.

15. The method of claim 13, wherein the performance characteristics comprise other transmission requests from other mobile devices and a future availability of network elements of the network segments.

16. The method of claim 13, further comprising:

responsive to the anticipated power state not being the high-power state, rescheduling, by the server, the transmission of the second data packet to the reschedule time.

17. The method of claim 13, wherein the first request for transmission is associated with a first application being executed by the mobile device, and wherein a second request for transmission is associated with a second application being executed by the mobile device.

18. The method of claim 13, wherein the first data packet is associated with a first application being executed by the mobile device, and wherein the second data packet is associated with a second application being executed by the mobile device.

* * * * *